United States Patent [19]

Thate

[11] 4,190,185
[45] Feb. 26, 1980

[54] ARRANGEMENT FOR TRANSPORTING PHOTOGRAPHIC FILM, AND THE LIKE

[75] Inventor: Kurt Thate, Munich, Fed. Rep. of Germany

[73] Assignee: AGFA-Gevaert, A.G., Leverkusen, Fed. Rep. of Germany

[21] Appl. No.: 652,138

[22] Filed: Jan. 26, 1976

[30] Foreign Application Priority Data

Jan. 31, 1975 [DE] Fed. Rep. of Germany ....... 2503954

[51] Int. Cl.² ........................ B65H 17/24; B65H 5/02
[52] U.S. Cl. .................................. 226/172; 271/274
[58] Field of Search ............... 226/171, 172, 173, 88; 271/248, 250, 272, 273, 274; 26/97, 93, 89; 38/143; 198/165, 628, 688

[56] References Cited

U.S. PATENT DOCUMENTS

| 562,831 | 6/1896 | Iles | 38/143 X |
|---|---|---|---|
| 2,880,998 | 4/1959 | Middleton et al. | 271/272 |
| 2,899,201 | 8/1959 | Pirot | 226/172 X |
| 3,120,794 | 2/1964 | Gold | 271/272 X |
| 3,256,558 | 6/1966 | Andersen et al. | 226/172 X |
| 3,342,386 | 9/1967 | Rademacher | 38/143 X |
| 3,611,407 | 10/1971 | Alden | 226/172 X |

Primary Examiner—Bruce H. Stoner, Jr.
Attorney, Agent, or Firm—Michael J. Striker

[57] ABSTRACT

Sheet material is physically contacted only at its lateral edge portions by transport elements for transporting the sheet material along a predetermined transport path. The central portions of the sheet material are not physically contacted, to prevent damage to them. Because the sheet material is held only at its lateral edge portions, sagging or bulging of the central portion of the sheet material could occur. To prevent this, the sheet material is tensioned in direction transverse to the sheet material transport direction, during actual transport, to an extent sufficient to prevent sagging or bulging of the sheet material during such transport.

7 Claims, 8 Drawing Figures

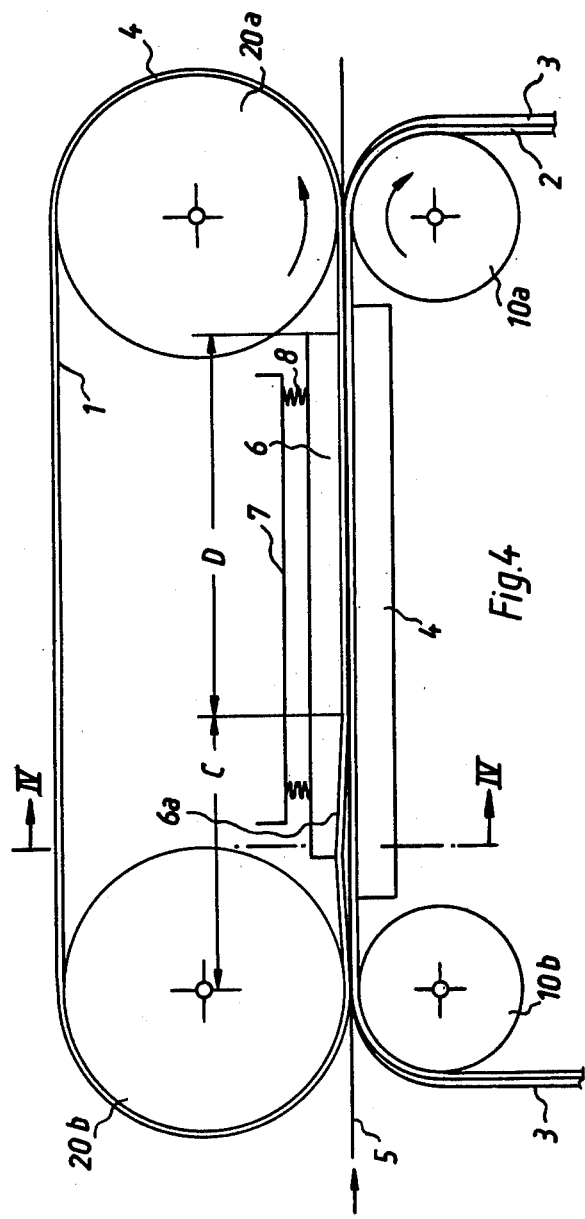
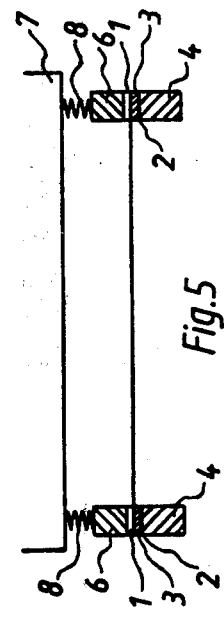
Fig.4
Fig.5

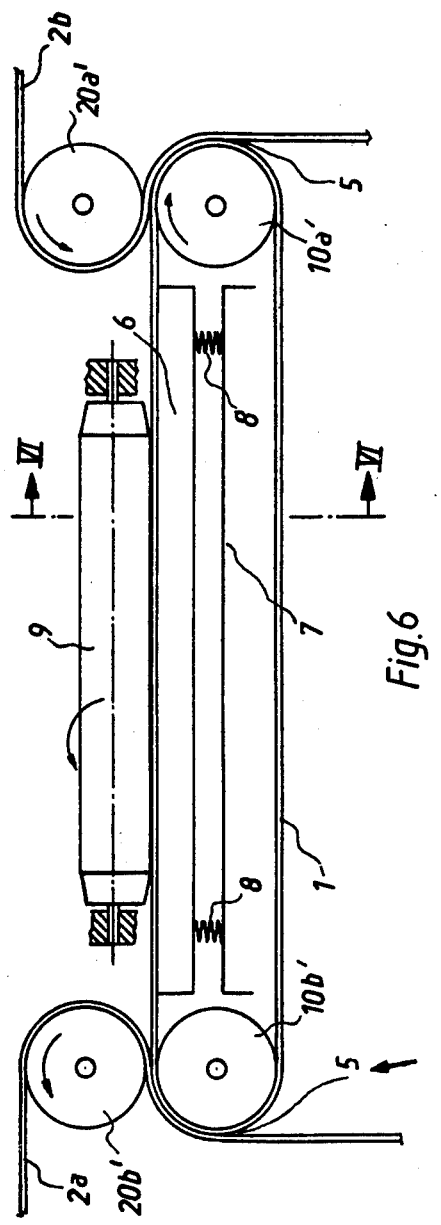
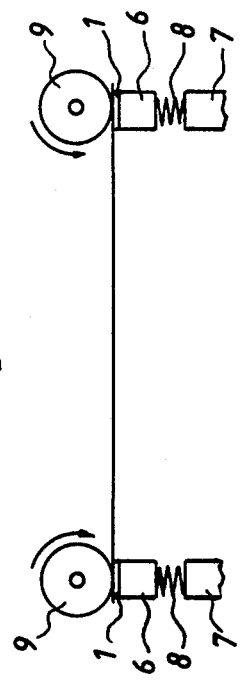

ARRANGEMENT FOR TRANSPORTING PHOTOGRAPHIC FILM, AND THE LIKE

BACKGROUND OF THE INVENTION

The invention relates to transport and guide arrangements of the conveyor-belt type, particularly for use with photographic and x-rays apparatuses, for transporting flexible sheet material of the type which, for one reason or another, is to be physically contacted by the transporting means only at its lateral edge portions and not on either of its two faces.

More particularly, the invention relates to such arrangements wherein each edge portion of the sheet material is engaged from opposite sides by narrow conveyor belts which effect the desired transport, with such pairs of cooperating conveyor belts being trained about pairs of driven guide rollers or pulleys.

In many circumstances in photography, copying and related fields, sheet material, such as photosensitive copy paper, coated copy paper, polyester webs or x-ray film, must be transported in such a way that only the edge portions of the sheet material are physically engaged by the conveying means, with the major surface portions of both sides of the sheet material not being physically contacted by conveying or other structure. Usually, the sheet material can be transported in this way by using narrow conveyor belts arranged in pairs with the conveyor belts of each pair engaging the associated edge portion of the sheet material from respective opposite sides. The sheet material will then be transported along the path of travel of the conveyor belts.

With known transport arrangements of this type, the sheet material being conveyed may bulge at its central portion, particularly when travelling around a deflection or guide roller or pulley, due to the inherent weight of the sheet material. Even when travelling along straight-line sections of the travel path, the sheet material being conveyed may sag in the middle due to its inherent weight and/or bulges may develop in the material for the same reason as are involved with travel of the material along curved sections of the path.

if the sheet material deviates from its proper planar shape serious problems may result. In some circumstances the sheet material must be made to exactly occupy a certain plane for optical reasons. As another example, a feeding device in the processing apparatus may engage the leading (transverse) edge of the sheet material, so that if this edge is not prefectly straight a malfeed may occur.

Commonly owned U.S. Pat. No. 3,836,060 discloses a copying apparatus for long strips of copying material. The unexposed copying material is transported in front of a copying window and while in that position is subjected to tension in the longitudinal direction. This tensioning of the strip results from the pinching of the strip between the two cooperating transport cylinders located upstream of the copying window, on the one hand, and, on the other hand, from the provision, somewhat downstream of the copying window, of a frictional engaging element. The frictional engaging element engages a portion of the strip downstream of the copying window and urges it downstream, so as to tighten and flatten out the portion of the strip located at the copying window. However, the tensioning arrangement disclosed in that patent can only be used to effect tensioning in the longitudinal direction, because the pinching rollers cannot be arranged to establish a tension in direction transverse to the strip transport direction. Also, with the arrangement disclosed in that patent, it is not possible to tension the strip during strip transport.

SUMMARY OF THE INVENTION

It is a general object of the invention to provide a transport and guide arrangement of the general type in question so designed that the sheet material can be transported without bulging or sagging.

This general object, and others which will become more understandable from the description, below, of preferred embodiments, can be met, according to one advantageous concept of the invention, by employing at one side of the lateral edge portions of the sheet material frictional engaging elements. The frictional engaging elements frictionally engage the sheet material and have a coefficient of friction, relative to the sheet material, greater than that of cooperating conveyor belts located at the opposite side of the lateral edge portion. The frictional engaging elements are lightly pressed against the sheet material and the frictional engaging elements move outward away from the longitudinal centerline of the travelling sheet material, transverse to the sheet travel direction.

By means of the above, the frictional forces exerted upon the lateral edges of the sheet material, transverse to its travel direction and oriented outwards away from the longitudinal centerline of the sheet material, cause the sheet material to be transversely tensioned during actual transport. In this way, the sheet material retains its planar form during travel along straight path sections and assumes the proper cylindrical form during travel around curved guide elements, such as guide rollers or pulleys.

In one embodiment of the invention, the frictional engaging elements are provided on cooperating second conveyor belts and have the form of elastic teeth or ridges pointing towards the sheet material and slightly inclined outward, i.e., away from the longitudinal centerline of the travelling sheet material. As a result, when the conveyor belts provided with such inclined elastic teeth travel about guide rollers or the like, the conveyor belts will undergo a certain amount of stressing causing the teeth to flatten down somewhat and in so doing move a certain distance outward—i.e., away from the longitudinal centerline of the travelling sheet material—urging the lateral edge portions of the sheet material in the same direction. Also contributing to such tipping of the inclined teeth is the couterpressure exerted by the first conveyor belts. When the conveyor belts provided with such inclined teeth or ridges are travelling along the straight sections of the sheet travel path, then a similar outward bending of the inclined teeth can be accomplished by using a pressure bar, or the like, which is urged by biasing springs against the back side of the first conveyor belt and is resisted by the counterpressure offered by a fixed support located adjacent the back side of the toothed or ridged second conveyor belt.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 4 is a schematic side view of an embodiment like that of FIG. 1 provided with means for transversely tensioning the transported sheet material during its travel along a straight section of its travel path.

FIG. 5 is a transverse section through the embodiment of FIG. 4, taken on line IV—IV of FIG. 4;

FIG. 6 is a schematic side view of a further embodiment; and

FIG. 7 is a transverse section taken on line VI—VI of FIG. 6.

DESCRIPTION OF THE PREFERRED EMBODIMENTS

Figure 1:
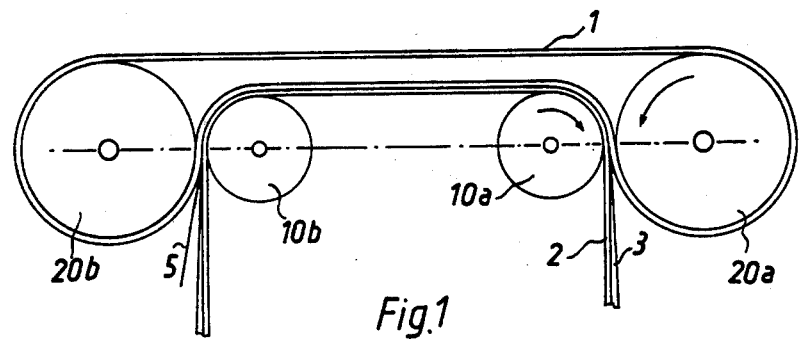
FIG. 1 is a schematic side view of a first embodiment of the invention.

In the arrangement depicted in FIG. 1, numeral 1 denotes a first conveyor belt trained about a pair of rollers 20a, 20b, of which roller 10a is the driven one. Trained about the rollers 10a and 10b is a second conveyor belt 2. Roller 20a is a driven roller and is coupled with roller 10a, by means of gearing, in such a manner that the circumferential speeds of the rollers 10a, 20a, and accordingly the travel speeds of the conveyor belts 1 and 2, are the same. Integrally formed on the second conveyor belt 2 are frictional engaging elements 3 having the form of inclined teeth. These inclined teeth 3 are inclined in outward direction—i.e., in direction transverse to the transport direction of the sheet material and in the direction in which the sheet material is to be tensioned to effect the desired flattening of the sheet material. In order to attain a good frictional engagement, it is advantageous to provide as many of such teeth next to one another as possible. Advantageously, these teeth are arranged in a raster—i.e., in rows and columns—with the spacing between neighboring teeth being equal to about the height of one individual tooth.

Instead of a large number of individual teeth arranged in rows extending in the direction of elongation of the conveyor belt, use could be made of longitudinal ridges. These longitudinal ridges would have the same wedge-shaped cross-sectional configuration and would run along the length of the conveyor belt. The side-by-side arrangement of such longitudinal ridges would lead to the same cross-sectional configuration of the belt as shown in the transverse cross-sectional view of FIG. 2.

The wedge-shaped teeth or elongated ridges are advantageously made of an elastomeric material having a high coefficient of friction relative to the sheet material to be transported and furthermore having a low hardness. In contrast, the first conveyor belt should have a comparatively smooth surface—i.e., its coefficient of friction should be lower than that of the elastomeric material and of the sheet material.

Figure 2:
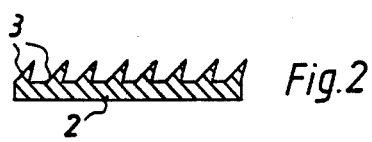
FIG. 2 is a transverse section through a conveyor belt used in the embodiment of FIG. 1.

The operation of the arrangement shown in FIGS. 1 and 2 is as follows:

A sheet 5 is fed into the infeed contact location intermediate the conveyor belts 1 and 2 in the direction in which the sheet is to be guided and transported. As a result, its two lateral edge portions will each be engaged from above and below by the first and second conveyor belts of the left and right conveyor belt pairs. The sheet 5 travels at the travel speed of the conveyor belts 1 and 2. The central portion of the sheet 5 is unsupported and not physically contacted either from above or from below.

Figures 3A, 3B:
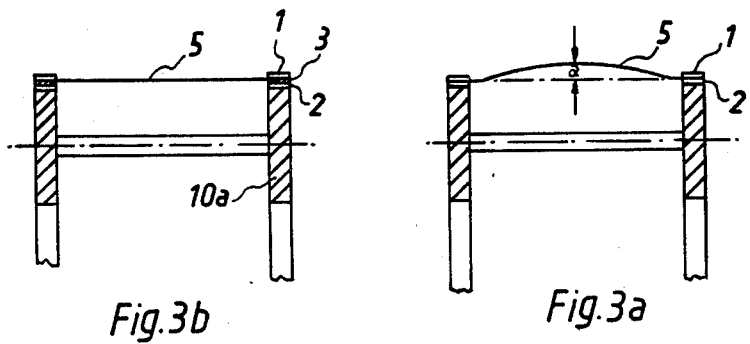
FIG. 3a is a transverse section through an arrangement of the general type in question, showing how the transported sheet material bulges when travelling around guide rollers in the absence of means for transversely tensioning the sheet material.
FIG. 3b is a transverse section through the embodiment of FIG. 1, showing how in contrast to FIG. 3a the sheet material retains its proper shape when it is transversely tensioned according to the invention.

With a conventional arrangement of the general type depicted, it can easily happen that the central portion of the sheet 5 will bulge upwards or sag downward, as shown in FIG. 3a, particularly when travelling not in a straight path but instead around one of the guide rollers. As a result, the geometrical form of the sheet deviates from the desired cylindrical form by the amount a. This is prevented with the arrangement shown in FIGS. 1 and 2 by the provision of the frictional engaging elements 3 and the establishment of the aforementioned relationships among the various coefficients of friction.

The frictional engaging elements 3 which engage the left edge of the sheet 5 move the engaged portion of the sheet leftward, whereas the elements 3 which engage the right edge of the sheet 5 move the engaged portion of the sheet rightward, so as to transversely tension and thereby flatten out the sheet. This action is attributable to several effects. The engaging portions 3 on the right conveyor belt 2 are inclined rightward as shown in FIG. 2, whereas those on the left conveyor belt 2 are inclined leftward. The counterpressure exerted upon such inclined projections 3 by the associated conveyor belts 1 causes the inclined projections 3 to move in the direction of their inclination—i.e., outwardly away from the central portion of the sheet. Additionally, as each conveyor belt 2 passes around a guide roller 10a, the conveyor belt 2 undergoes a stretching and deformation such as to cause the inclined projections 3 to flatten down and in so doing move slightly outward in the direction of their inclination. This outward motion of the inclined projections 3, in conjunction with the frictional engagement between the inclined projections 3 and the sheet 5, causes the sheet 5 to be flattened out, and prevents the formation of bulges or sags. Instead, the sheet 5, somewhat stressed, travels around the rollers 10a and in so doing keeps the cylindrical form which it should have, as shown in FIG. 3b.

FIGS. 4 and 5 depict an arrangement for transporting the sheet material 5 in a straight path, provided with means for preventing the development of transverse sags or bulges in the sheet material. Elements corresponding to those shown in FIGS. 1-3 are denoted by the same reference numerals. Thus, conveyor belt 1 again has a coefficient of friction which is lower, relative to the sheet material 5 to be frictionally engaged, than is the coefficient of friction of the material of the frictional engaging elements 3 which, again, are formed integral on one side of the second conveyor belt 2.

Numeral 4 denotes a fixed support over which the back side of conveyor belt 2 is guided. Lying upon the back side of conveyor belt 1 is a pressure bar 6 which is pressed by means of compression springs 8 against the conveyor belt 1. The springs 8 are confined between pressure bar 6 and a fixed support 7. Support 4 and the pressure bars 6 correspond in their breadth to the breadth of the associated conveyor belts and extend along the straight-line path section of the arrangement. At the beginning of the straight-line path section there is provided a zone C in which the pressure bar 6 has an inclined portion 6a. Inclined portion 6a together with the lower fixed support 4 define an infeed gap which narrows in the direction of sheet material transport.

The arrangement shown in FIGS. 4 and 5 operates as follows:

The conveyor belts 1 and 2 are respectively driven by drive rollers 10a and 20a. As viewed in FIG. 4, the sheet material 5 is transported from left to right. Without the aforedescribed pressure elements, the conveyor belts would begin to wave along the straight-line transport path—i.e., the frictional engaging elements would no longer be able to act upon and transversely tension the sheet material 5. By means of the inventive pressure elements, the pressure bar 6 is pressed onto the back side of the conveyor belt 1 in consequence of the spring force of compression spring 8 and is resisted by the fixed support 4. The conveyor belts 1 and 2 are pressed together, and the inclined teeth 3 as a result move outwards (away from the centerline intermediate the left and right conveyor belt arrangements). In consequence of the frictional action of the pointed teeth 3, the outwards moving teeth 3 urge the sides of the sheet material 5 outward from the middle so as to tighten or flatten out the sheet material.

The provision of the zone C has proved particularly advantageous when the sheet material 5 is to pass around a deflecting roller upstream of the straight-line portion of its transport path. As described above, zone C is formed by a gap which narrows in the sheet transport direction.

This means that the pressure exerted by pressure bar 6 upon the frictional engaging elements 3 gradually increases along the length of zone C to the value associated with zone D. The advantage of this is that the elements 3, after being pushed outward during the travel about rollers 10b, 20b, will reassume their original positions before entering into zone D. This restoration of the frictional engaging elements 3 to their original unstressed condition makes it possible for them to thereafter be subjected to a gradual increasing of stressing as they travel through zone C. Thus, when they travel thereafter through zone D they will be capable of exerting once more a stressing force upon the sheet material such as to tighten or flatten out the sheet material. If the frictional engaging elements 3 are not given this opportunity to reassume their original unstressed condition before passage through the straight-line portion of the sheet travel path, then during passage through the straight-line portion they might not stress the sheet material to a sufficient degree. In other words, what occurs intermediate the curved and straight portions of the sheet travel path is a regeneration of the tensioning capability of the frictional engaging elements 3.

Another embodiment of the invention is shown in FIGS. 6 and 7. This embodiment makes use of a belt drive expedient according to which the sheet material is engaged from opposite sides by cooperating conveyor belts only during certain portions of its travel. Trained about the roller pair 10a', 10b' is a conveyor belt 1 having a low coefficient of friction. Located next to roller 10b is a counterpressure roller 20b' provided with a cooperating conveyor belt 2a; located next to roller 10a is a counterpressure roller 20a' provided with a conveyor belt 2b. Accordingly, only the first conveyor belts 1, i.e., those which support the sheet material from below, extend from one to the other of the rollers 10b', 10a'. Arranged above these conveyor belts 1 adjacent the opposite side of the sheet material 5 are cylinders 9. The axes of these cylinders 9 extend parallel to the respective conveyor belts 1, and the cylinders 9 contact the upper side of the sheet material 5 at the edge regions of the latter, approximately just above the middles of the respective conveyor belts. Provided on the inner side of the conveyor belts 1 is a counterpressure arrangement comprised of a pressure bar 6, compression springs 8 and a fixed mounting 7. This counterpressure arrangement corresponds to that of FIG. 4.

The surface of cylinders 9 have a coefficient of friction greater than that of the conveyor belts 1. In addition, cylinders 9 rotate about their axes in directions such that their frictional forces are exerted in outward direction, i.e., away from the longitudinal centerline of the travelling sheet material.

The operation of the embodiment shown in FIGS. 6 and 7 is as follows:

Sheet material 5 inserted between the conveyor belts 2a and 1 is guided around the roller 10b and rides upon the conveyor belt 1 toward the cylinders 9. Thereupon, the sheet material enters into the region between the conical portions of the cylinders 9 and the conveyor belts 1. The travel of the conveyor belts 1 in the sheet transport direction effects transport of the sheet material in such direction. The cooperation between the counterpressure arrangement and the rotating cylinders 9 causes the sheet material to be transversely tensioned enough to assure that sagging will be prevented.

The advantage of the embodiment just described is that it is possible to take into account the extent to which the sheet material needs such transverse tensioning and then appropriately vary the rotary speed of the cylinders 9, for example to assure that sagging will be prevented without excessively stressing the sheet material. Preferably, the cylinders 9 are covered with a velvet-like textile material or a velvet-like lacquer or coating. When the pressure exerted by the counterpressure arrangement has the proper value, the velvet-like surface of cylinders 9 makes it possible to effect forward transport of the sheet material in the desired manner without the need for resort to any special additional measures.

Although the illustrated embodiments have involved the travel of sheet material with a horizontal orientation, the principles of the invention are likewise applicable to such transport of the sheet with a vertical orientation.

It will be understood that each of the elements described above, or two or more together, may also find a useful application in other types of constructions differing from the types described above.

While the invention has been illustrated and described as embodied in particular sheet-material transporting arrangements, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for transporting flexible sheet material, particularly photographic film, X-ray film, or the like, of the type which should not be physically contacted at its major surfaces, the arrangement comprising in combination, transport-force-applying means for engaging the sheet material at only the lateral edge portions of the sheet material and effecting transport of the sheet material along a predetermined transport path by directly exerting transport force upon only the lateral edge portions of the sheet material, without physically contacting the major central portion of the sheet material in order to prevent damage to such central portion, and including tensioning means operative during sheet material transport for tensioning the sheet material in direction transverse to its transport direction to an extent sufficient to prevent sagging or bulging of the sheet material during such transport, wherein the transport-force-applying means comprises guides and a pair of first conveyor belts trained about the guides to define the transport path, each first belt frictionally engaging a respective one of the lateral edge portions from one of the two sides of the material for exerting frictional transport force upon such lateral edge portion in the direction of elongation of the belt, and wherein the tensioning means comprises frictional engaging elements arranged to frictionally engage the lateral edge portions from the other of the two sides of the material, the frictional engaging elements of the tensioning means being movable in direction away from the longitudinal centerline of the travelling sheet material for effecting the transverse tensioning of the sheet material, wherein the friction coefficient of the frictional engaging elements, relative to the sheet material, is greater than the friction coefficient of the first conveyor belts, wherein the transport-force-applying means further comprises a pair of second conveyor belts cooperating with the first belts to frictionally engage the lateral edge portions of the sheet material between the first and second belts, and wherein the frictional engaging elements are provided on the second belts and have the form of elastically resilient elements extending along the whole length of the second belts and pointing towards the sheet material and inclined in direction away from the longitudinal centerline of the travelling sheet material, the transport path for the sheet material having at least three sections, the transport-force-applying means and the tensioning means comprising means for lightly pressing the conveyor belts against each other during travel thereof along the first and third sections but not the second section to effect outward displacement of the frictional engaging elements along the first and third sections but not the second section, whereby to permit the frictional engaging elements to reassume a non-displaced regenerated condition during travel along the second section so as to make possible renewed outward displacement during travel along the third section.

2. The arrangement defined in claim 1, wherein the elastically resilient elements are made of an elastomeric material having a high friction coefficient and a low hardness.

3. The arrangement defined in claim 1, wherein the means for lightly pressing includes a fixed support at one side of the cooperating belts, a pressure bar at the other side of the cooperating belts, and means for pressing the pressure bar towards the fixed support to lightly press the first and second conveyor belts together at the straight section.

4. The arrangement defined in claim 1, the elastically resilient frictional engaging elements on the second belts being so configurated and oriented as to be displaced away from the longitudinal centerline of the travelling sheet material in response to the pressing together of the first and second conveyor belts.

5. The arrangement defined in claim 1, wherein the transport-force-applying means and the tensioning means comprise guide rollers for guiding the first and second conveyor belts around curved conveyor belt path sections and operative for tensioning the conveyor belts as the belts pass over the guide rollers to effect a displacement of the frictional engaging elements in direction away from the longitudinal centerline of the travelling sheet material.

6. The arrangement defined in claim 1, wherein the frictional engaging elements are endless frictional engaging members extending in the sheet material travel direction for effecting the requisite transverse tensioning of the sheet material.

7. The arrangement defined in claim 1, wherein the means for lightly pressing the conveyor belts along the first and third sections comprises a pair of cooperating guide rollers for guiding the first and second conveyor belts around curved paths leading into the first section and operative for tensioning the conveyor belts as the belts pass over the guide rollers to effect a displacement of the frictional engaging elements in direction away from the longitudinal center line of the travelling sheet material and additional means for positively pressing the first and second conveyor belts together along the third section of the transport path.

* * * * *